(12) United States Patent
Soliman et al.

(10) Patent No.: US 12,517,099 B2
(45) Date of Patent: Jan. 6, 2026

(54) SYSTEMS AND METHODS FOR AUTOMATIC ONLINE ANALYZER VALIDATION AND CALIBRATION

(71) Applicant: SAUDI ARABIAN OIL COMPANY, Dhahran (SA)

(72) Inventors: Mohamed Ahmed Soliman, Ras Tanura (SA); Mohamed Ahmed Saad Mahmoud, Dammam (SA); Hassan Mohammadali Al Matouq, Al Qatif (SA); Hamad Mohammed Alsharekh, Dhahran (SA); Saeed Mohammed Alamoudi, Ras Tanura (SA); Matlaq Mahdi Alqahtani, Safwa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 714 days.

(21) Appl. No.: 18/050,273

(22) Filed: Oct. 27, 2022

(65) Prior Publication Data

US 2024/0142417 A1  May 2, 2024

(51) Int. Cl.
*G01N 33/00*  (2006.01)
(52) U.S. Cl.
CPC ..... *G01N 33/0006* (2013.01); *G01N 33/0075* (2013.01)
(58) Field of Classification Search
CPC ........... G01N 33/0006; G01N 33/0075; G01N 2201/1214; G01N 2021/354; G01N 33/0026; G01N 33/0031; G01N 33/0022; G01N 21/274; G01R 35/005
USPC ........................................................ 73/1.06
See application file for complete search history.

(56) References Cited

U.S. PATENT DOCUMENTS

| 2004/0011421 A1* | 1/2004 | Bartlett | ................ | B67D 7/3218 |
| | | | | 141/94 |
| 2013/0186268 A1* | 7/2013 | Hill | ......... | C10L 3/106 |
| | | | | 95/10 |
| 2018/0259426 A1* | 9/2018 | He | ......... | G01N 17/00 |

FOREIGN PATENT DOCUMENTS

| CN | 204035196 U | 12/2014 |
| CN | 105589381 A | 5/2016 |
| KR | 102407886 B1 | 6/2022 |

OTHER PUBLICATIONS

ABB Gas Oil Separation Plant http://www04.abb.com/global/seitp/seitp202.nsf/0/18414ee6c6813f5548257c14001f11f2/$file/Oil+and+gas+production+handbook.pdf.
(Continued)

*Primary Examiner* — John E Breene
*Assistant Examiner* — Truong D Phan
(74) *Attorney, Agent, or Firm* — Vorys, Sater, Seymour and Pease LLP

(57) ABSTRACT

An automatic online analyzer validation and calibration system receives operating parameter input signals from sensors, receives a measured value of a selected process variable from a physical analyzer, determines a difference between the measured value and an inferred value of the selected process variable determined by a controller based on the operating parameter input signals using an inferential analyzer; and if the difference between the measured value and the inferred value exceeds a threshold, initiates a recalibration of the physical analyzer or recalibration of the inferential analyzer. In one example, the automatic online analyzer validation and calibration is used in a gas dehydration system to validate and calibrate a physical moisture analyzer.

20 Claims, 5 Drawing Sheets

(56) References Cited

OTHER PUBLICATIONS

Soliman, Mohamed , Alwani, Mohammed Abdo, and Abdullah Younis Aiderous. "Troubleshooting Glycol Loss in Gas Dehydration Systems Using Data Analysis at Upstream Operation." Paper presented at the Abu Dhabi International Petroleum Exhibition & Conference, Abu Dhabi, UAE, Nov. 2019.
GPSA-20 Gas Dehydration.

* cited by examiner

SYSTEMS AND METHODS FOR AUTOMATIC ONLINE ANALYZER VALIDATION AND CALIBRATION

FIELD OF THE DISCLOSURE

The present disclosure relates generally to automatic validation and calibration of online analyzers and, more particularly, to the automatic validation and calibration of moisture analyzers in gas dehydration facilities.

BACKGROUND OF THE DISCLOSURE

Conventionally, online analyzers have been used to monitor various process parameters in many applications. Online analyzers have been prone to malfunction resulting in inaccurate readings and costly repairs and recalibrations. In one example, an online analyzer monitors moisture content of a gas stream in a gas dehydration facility. Often when an online analyzer reports a measurement outside of acceptable limits, both the monitored gas stream and the online analyzer must be tested to determine which is responsible for the error. Such testing and validation efforts reduce the efficiency of gas processing facilities and increase overall costs. Accordingly, there remains a need for improvements in the systems and methods for validating and calibrating online analyzers, including moisture analyzers in gas dehydration facilities. More specifically, there remains a need for improved systems and methods for automatically validating and calibrating online analyzers, including moisture analyzers, in gas dehydration facilities.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a system is disclosed that includes a plurality of sensors configured to monitor operating parameters of a gas dehydration system; a physical moisture analyzer configured to measure moisture content of a gas stream; and a controller configured to: receive operating parameter input signals from the plurality of sensors, receive a measured moisture content of the gas stream from the physical moisture analyzer, determine a difference between the measured moisture content and an inferred moisture content determined by the controller based on the operating parameter input signals using an inferential moisture analyzer; and if the difference between the measured moisture content and the inferred moisture content exceeds a threshold, initiate a recalibration of the physical moisture analyzer or recalibration of the inferential moisture analyzer.

In another embodiment, a method is disclosed that includes receiving, by a controller, operating parameter input signals from a plurality of sensors configured to monitor operating parameters of a gas dehydration system; receiving, by the controller, a measured moisture content of a gas stream from a physical moisture analyzer; determining, by the controller, an inferred moisture content based on the operating parameter input signals using an inferential moisture analyzer module; determining, by the controller, a difference between the measured moisture content and the inferred moisture content; and if the difference between the measured moisture content and the inferred moisture content exceeds a threshold, initiating a recalibration of the physical moisture analyzer or recalibration of the inferential moisture analyzer.

In yet another embodiment, a controller for automatic online analyzer calibration in a gas dehydration system is disclosed, in which the controller includes an operating parameter input module configured to receive operating parameter input signals from a plurality of sensors configured to monitor operating parameters of the gas dehydration system; a physical moisture analyzer input module configured to receive a measured moisture content of a gas stream from a physical moisture analyzer; an inferential analyzer module configured to determine an inferred moisture content based on the operating parameter input signals; a validation module configured determine a difference between the measured moisture content and the inferred moisture content, and if the difference between the measured moisture content and the inferred moisture content exceeds a threshold, initiate a recalibration of the physical moisture analyzer or recalibration of the inferential moisture analyzer; and a system control module configured to control a plurality of valves to provide a calibration gas to the physical moisture analyzer to recalibrate the physical moisture analyzer.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
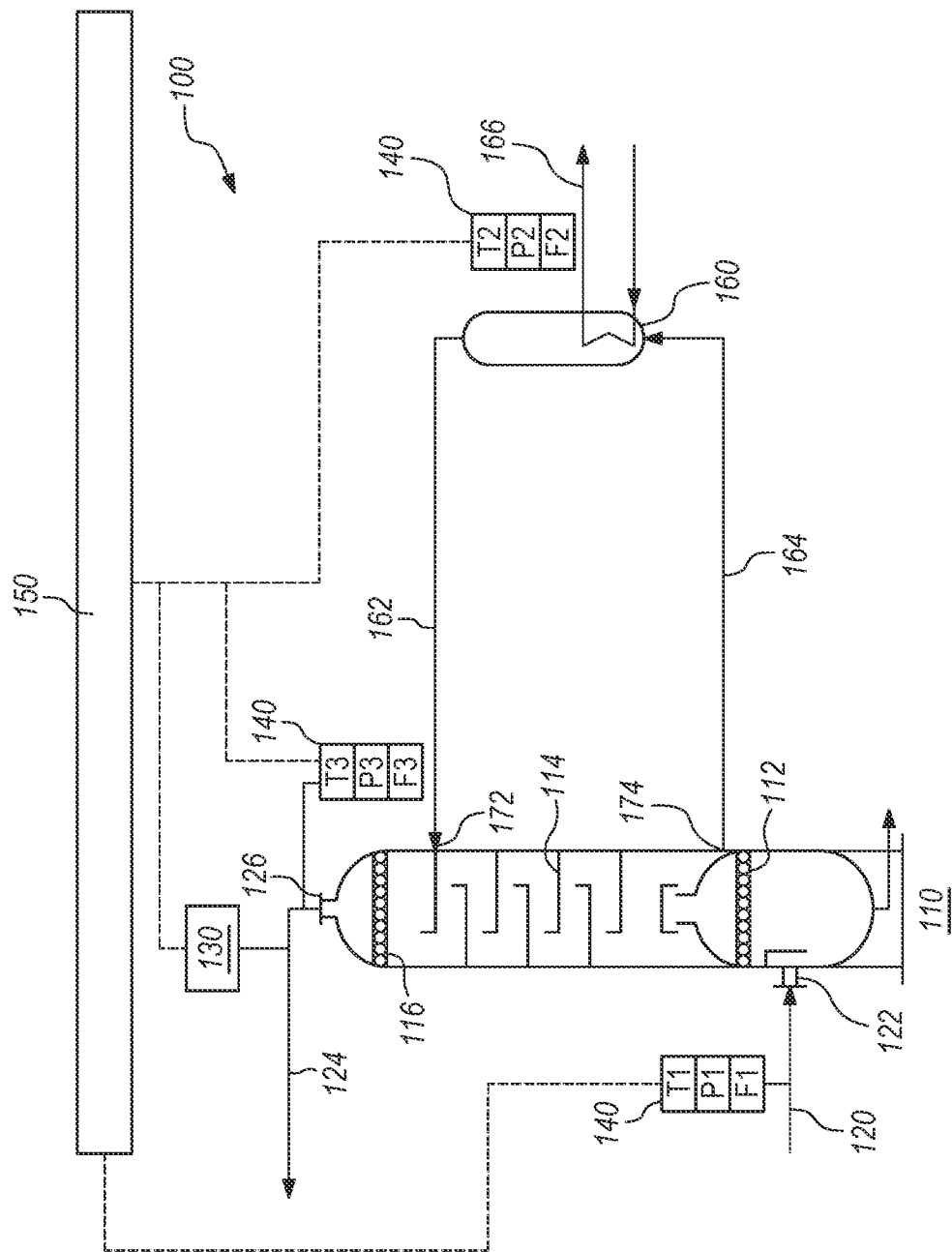
FIG. 1 is an embodiment of a gas dehydration system.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to systems and methods for the automatic validation and calibration of online analyzers. More particularly, the present disclosure further relates to automatic validation and calibration of online analyzers to detect and correct for changes in operating parameters of an associated facility or process. For purposes of illustration, the present disclosure is described in relation to a physical moisture analyzer employed in a gas dehydration system; however, the present disclosure may also be used to automatically validate and calibrate online analyzers in other systems in accordance with aspects of the present disclosure.

As used herein, an online analyzer refers to an analyzer, such as a sensor, that is configured to monitor a process variable. A process variable may be any variable relevant to a given process and may be measured at one or more locations within a process. In one example, a process variable may be the moisture content of a fluid, such as a gas stream. In particular, the moisture content of a gas stream after a dehydration process may be monitored to ensure the gas meets a required moisture content specification. By monitoring a process variable, changes in the process may be identified so that corrective action may be taken to ensure the product, such as the gas, remains within acceptable tolerances. In another example, a process variable may be the concentration of a particular element or compound within a fluid. As will be appreciated, one or more process variables may be measured throughout a system in order to confirm that the fluid meets the applicable criteria for the fluid at the location or step within the process, at which the process variable is measured.

Referring now to FIG. 1, an embodiment of a gas dehydration system 100 is illustrated. The gas dehydration system 100 includes both a gas dehydration section, including gas contactor 110, and a drying agent regeneration section, including regeneration system 160. The gas contactor 110 includes an inlet 122 through which the wet gas feed 120 enters the gas contactor. The gas contactor 110 also includes an outlet 126 through which dry gas stream 124 exits the gas contactor. In this context, the gas entering the dehydration system is referred to as wet and the gas exiting the dehydration system is referred to as dry indicating the removal of moisture that is expected to occur as the gas passes through the dehydration system, and particularly through the gas contactor 110. The dry gas stream 124 may also be referred to as the product which is produced for sale or for use by subsequent processes. In some embodiments, the gas dehydration system 100 may be a tri-ethylene glycol dehydration unit use to process gas in the petroleum industry.

In the illustrated embodiment, the gas contactor 110 further includes a filter 112, vanes 114 and a demister 116. The filter 112 is configured to remove entrained liquids and solids from the incoming wet gas feed 120. The wet gas feed 120 enters the gas contactor 110 and entrained liquids are removed and drained into a sump in a low section of the gas contactor. By filtering the incoming gas, foaming in the gas contactor 110 may be reduced or inhibited. After passing through the filter 112, the gas flows up through the section of the gas contactor 110 containing a plurality of vanes 114. At the same time, gas dehydration is achieved by injecting a drying agent into the gas contactor 110, where absorption of the water present in the gas takes place during the counter current contact between the gas and the drying agent.

The structure of the gas contactor facilitates the transfer of moisture from the gas to the drying agent within the gas contactor. The gas then passes through the demister 116 near the top of the gas contactor. The demister 116 removes entrained drying agent from the gas thereby reducing drying agent carryover. In one example, the demister 116 limits drying agent loss through entrainment to less than 0.05 gallon/MMSCF.

In one embodiment, the drying agent is tri-ethylene glycol (TEG). The lean glycol 162 enters the gas contactor 110 through glycol inlet 172, flows down through the section of the gas contactor containing a plurality of vanes 114, and exits the gas contactor through glycol outlet 174. Upon entering the gas contactor, the lean glycol may be distributed by a liquid distributor (not shown) to maximize contact between the lean glycol and the gas. The glycol exiting the gas contractor may be referred to as rich glycol 164 indicating the addition of moisture that is expected to occur as the glycol passes through the gas dehydration system and removes moisture from the gas.

After the rich glycol 164 exits the gas contactor 110, the rich glycol passes through the regeneration system 160 to remove suspended solids, remove liquid hydrocarbon, remove any gases from the glycol, and remove the moisture from the glycol. In one example, the regeneration system 160 removes such components to reach a glycol purity of at least ninety-seven percent (97%). The regeneration system 160 includes a reboiler 166. The regeneration system may also include other components such as coolers, pumps, flash knockout drums, filters and towers. The regeneration system may include one or more of each of such components as needed to achieve the desired purity level of the glycol. Collectively, the regeneration system 160 recycles the rich glycol 164 into lean glycol 162 for continued use in the gas dehydration system 100.

In various examples, the reboiler 166 may be electric or indirect gas fired, heated by passing hot flue gases through a fully immersed fire tube within the reboiler. In one example, the bath temperature of the reboiler 166 is controlled at 400° F. (204° C.), which may be achieved by regulating the flow of fuel gas to the heater of the reboiler. Having been regenerated by the regeneration system 160, the lean glycol 162 may be passed through a stripping column of the regeneration system 160 to further enhance the lean glycol concentration. By enhancing the lean glycol concentration, the dry gas stream 124 may be dehydrated to achieve a desired water dew point specification. In one embodiment, the stripping column of the regeneration system 160 is configured to raise the lean glycol concentration to at least 99.9%. Additional processing of the lean glycol 162, such as cooling and routing through circulation pumps, may also be performed before the lean glycol 162 is provided back to the gas contactor 110 to further absorb water from the gas.

As illustrated in FIG. 1, the gas dehydration system 100 includes an online analyzer to measure the moisture content of the dry gas stream 124 existing the gas contactor 110. The online analyzer may be a physical moisture analyzer 130. Moisture measurement is important in many industries and for many manufacturing and quality assurance processes. In the oil and gas industry, for example, trace moisture measurements are necessary in oil and gas processing plants and refineries, and may be used at one or more locations within a given plant or refinery. In addition to measuring moisture, gas processing plants may require fast and accurate measurements of other contaminants, such as hydrogen sulfide ($H_2S$), carbon dioxide ($CO_2$), and oxygen ($O_2$). Such contaminants may damage expensive equipment including turbo-machinery and pipelines, shorten desiccant, contactor, or molecular sieve lifetimes, and threaten the operator's ability to maintain tight process control and product quality. If such contaminants are not properly monitored and remediated, downstream customer may receive gas that does not meet the desired quality specifications.

In one embodiment, the physical moisture analyzer 130 is a tunable diode laser (TDL) analyzer, which includes a semi-conductor based laser that may be tuned to a specific wavelength of near infrared. The TDL analyzer may provide significant benefits, such as accurately pinpoint the presence of moisture in feed stocks, fuel gas streams, and natural gas. The use of online analyzers with automatic validation and calibration in accordance with the present disclosure may provide multiple benefits such as protection of expensive catalysts, enhanced assurance of product quality, avoiding hydrate formation, reducing or inhibiting pipeline corrosion, and avoidance of unnecessary shutdowns. The TDL analyzer includes a photometer. Conventional photometers, such as the non-dispersive infrared radiation absorption analyzer, and the ultraviolet radiation absorption analyzers, are less precise in measuring absorption bandwidth than TDL analyzers. The TDL analyzers offer high resolution (narrow spectral line width) that enables measurement of certain components at parts-per-billion (ppb) levels. The near infrared laser device enables measurement of moisture, methane, acetylene, hydrogen fluoride, hydrogen sulfide, ammonia, carbon dioxide, carbon monoxide, ethylene oxide and oxygen.

In operation, a TDL analyzer emits near infrared light at wavelengths that are absorbed by the gas or contaminant being measured (carbon dioxide, hydrogen sulfide, oxygen, water). The near infrared light passes through the gas being measured before it is received by the solid state detector. As the wavelength of the light is tuned across a specific wavelength, energy is absorbed by the gas or contaminant reducing the amount of light arriving at the detector at a particular wavelength. The result is a sharp peak shaped curve having a height directly proportional to the concentration of the target gas or contaminant. In addition, in TDL analyzers, the light source and receive are isolated from the process sample thereby reducing the risk of contamination of the analyzer.

Referring again to FIG. 1, the physical moisture analyzer 130 is configured to measure the moisture content of the dry gas stream 124 exiting the gas contactor 110. The physical moisture analyzer 130 may be a TDL analyzer as previously discussed, however other analyzers are also contemplated for use with the present disclosure. As the dry gas stream 124 exits the gas contactor 110, the physical moisture analyzer 130 measures the moisture content of the dry gas. The physical moisture analyzer 130 communicates with a controller 150. The controller 150 receives the measured moisture content of the dry gas stream 124 from the physical moisture analyzer 130. The controller 150 may be configured to process the output of the physical moisture analyzer 130 into the desired units or format for further processing.

The gas dehydration system 100 also includes a plurality of sensors for monitoring operating parameters of the system. As illustrated in FIG. 1, the gas dehydration system may include sensors to monitor one or more operating parameters of the wet gas feed 120, the dry gas stream 124, and the lean glycol 162. For example, the sensors may measure the temperature (T1), pressure (P1) and flow rate (F1) of the wet gas feed 120. Additional sensors may measure the temperature (T3), pressure (P3) and flow rate (F3) of the dry gas stream 124. Other sensors may measure the temperature (T2), pressure (P2) and flow rate (F2) of the glycol at a selected location of the regeneration system 160. The list of sensors is not limiting and not all sensors may be used for all applications.

Each of the sensors communicate with the controller 150 in a similar manner as the physical moisture analyzer 130 previously discussed. The controller 150 receives operating parameter input signals from the sensors enabling the controller to determine the value of the operating parameters being monitored in the system.

In one example, the wet gas feed 120 to the gas contactor 110 may have desired operating parameters where the pressure (P1) is 385 psig, the temperature (T1) is 135° F. for warm weather operation or 99° F. for cold weather operation. The dry gas stream 124 may have desired operating parameters where the pressure (P3) is 385 psig with a temperature of 147° F. In this example, the dry gas stream 124 may have a water dew point of 8° F. resulting in a water content of 7 lbs per MMSCF as measured by the physical moisture analyzer 130. By measuring the operating parameters with the sensors and the moisture content with the physical moisture analyzer 130, the controller 150 may determine when operating conditions or product quality have deviated from the desired values which suggests a process change has occurred or that one or more sensors or analyzer may require recalibration.

Figure 2:
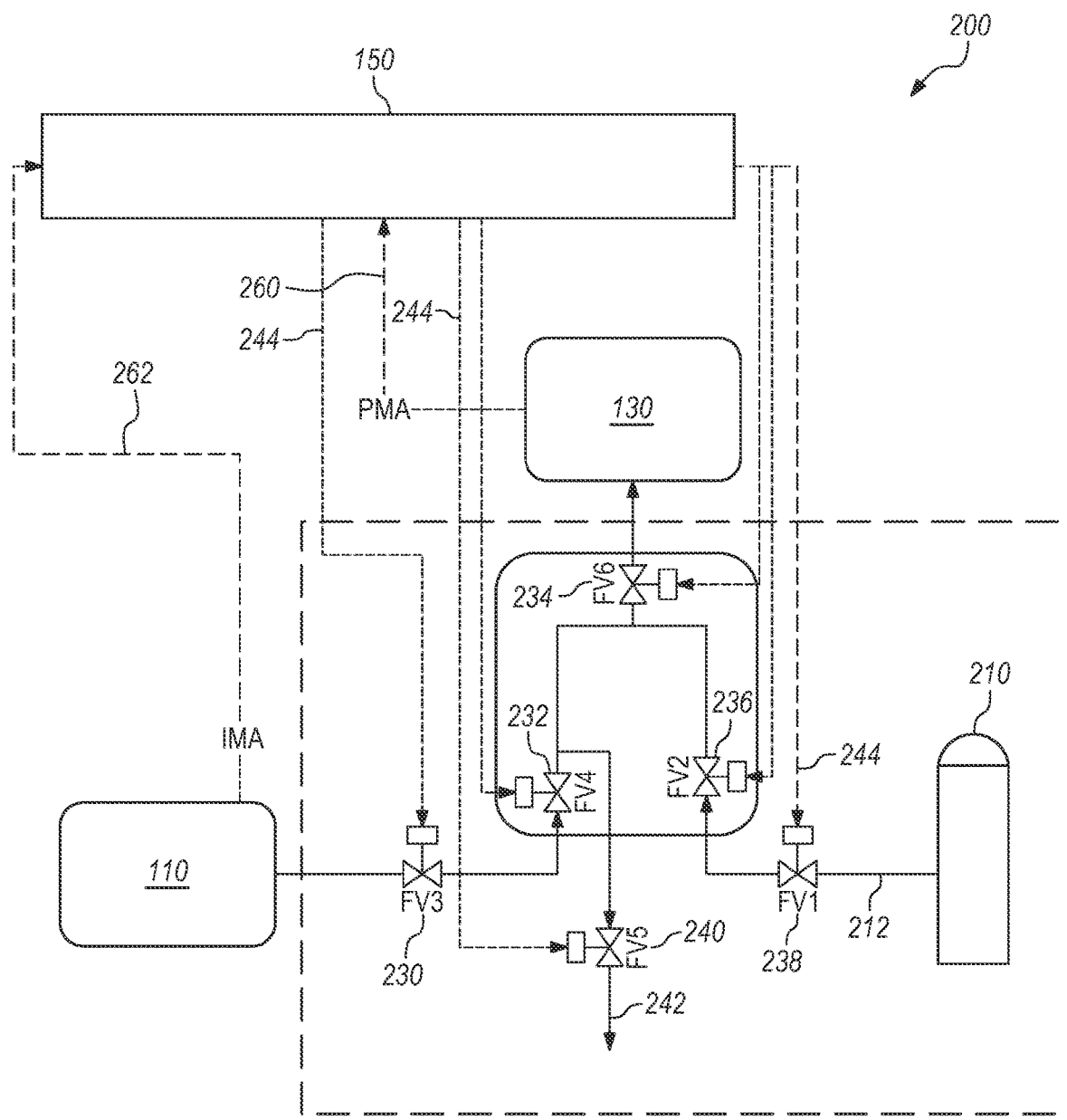
FIG. 2 is an embodiment of an online analyzer calibration system.

Referring now to FIG. 2, an embodiment of an online analyzer calibration system 200 is illustrated. The calibration system 200 operates in combination with the gas dehydration system 100 discussed above. In one embodiment, the calibration system 200 includes a calibration gas supply 210 that contains a calibration gas 212 having a known moisture content for validating and calibrating the physical moisture analyzer 130. In addition, the calibration system 200 includes a plurality of valves for connecting either the dry gas stream 124 or the calibration gas 212 to the physical moisture analyzer 130.

The controller 150 provides output signals to control the plurality of valves in order to perform the validation and calibration of the physical moisture analyzer 130 using the calibration gas supply 210. During normal operation, the dry gas stream 124 exits the gas contactor 110, and valves 230, 232 and 234 open such that the dry gas stream flows to the physical moisture analyzer 130 where the moisture content is measured as previously discussed. At the same time valves 236, 238 and 240 are closed preventing flow of the dry gas stream or calibration gas through such valves. When a deviation in the measured moisture content is determined, the controller 150 initiates a validation or calibration process. During a validation or calibration of the physical moisture analyzer 130, valves 230, 232, and 234 will close, and valves 238, 236, and 240 will open allowing the gas within the system to be purged to the flare 242. Once the system is purged, valve 240 will close and valve 234 will open allowing calibration gas 212 to be provided to the physical moisture analyzer 130 to validate and recalibrate the physical moisture analyzer. By providing a calibration gas having a known moisture content, the controller 150 can validate the accuracy of the physical moisture analyzer 130 by comparing the measured moisture content with the known moisture content of the calibration gas. After the validation and calibration process is complete, valves 236 and 238 will close and valves 230 and 232 will open such that the dry gas stream 124 is again provided to the physical moisture analyzer 130 to me measured.

During the validation and calibration process, the controller 150 also receives an input signal 260 from the physical moisture analyzer 130 and receives input signals 262 from the plurality of sensors monitoring the operating parameters of the system. Using these inputs, the controller 150 determines when a validation or calibration is required.

In response to such determination, the controller 150 provides one or more output signals 244 to control the plurality of valves and the calibration gas supply 210.

Figure 3:
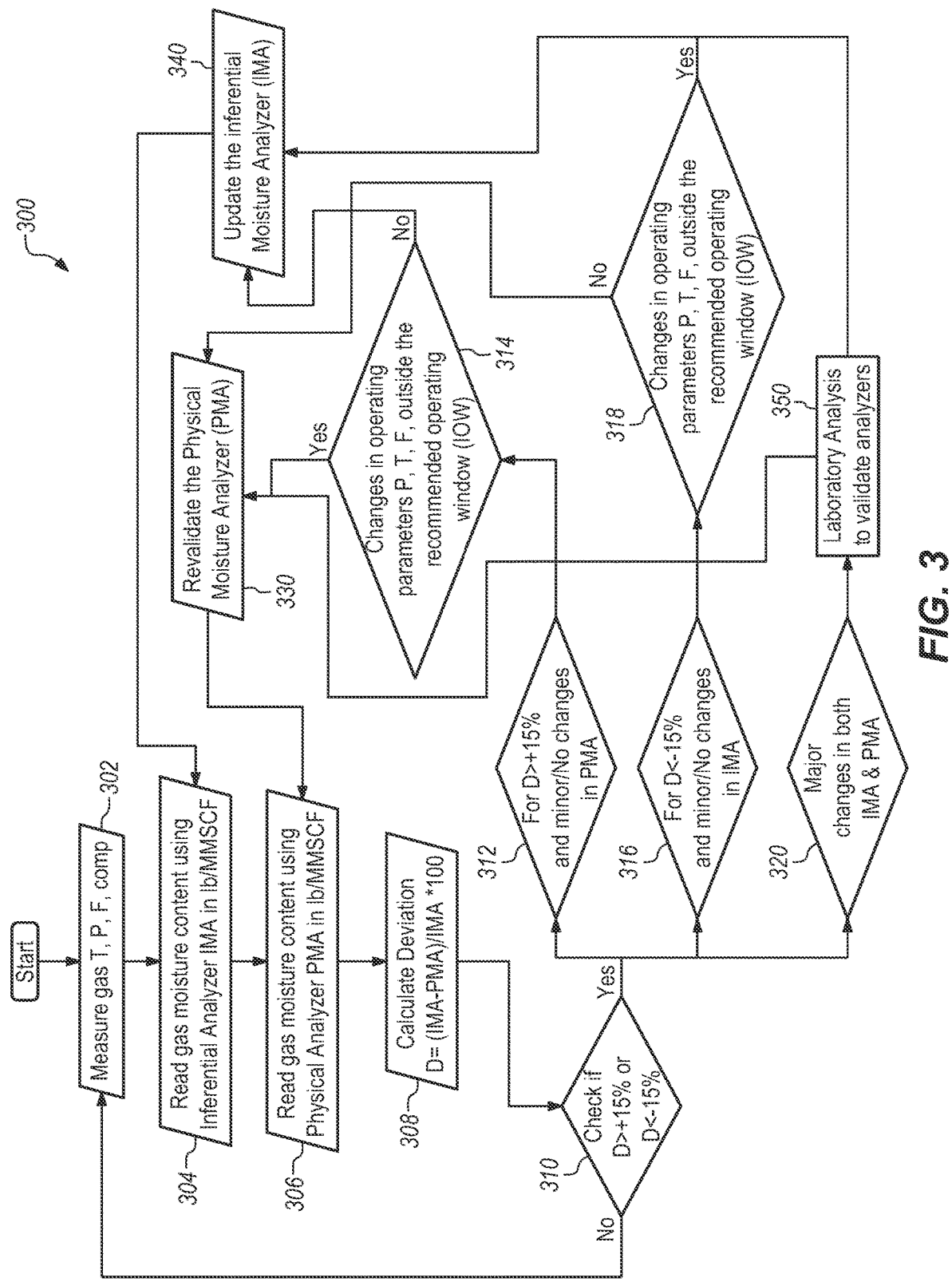
FIG. 3 is flow chart of a method for validating and calibrating an online analyzer according to the present disclosure.

Referring now to FIG. 3, flow chart of a method 300 for validating and calibrating an online analyzer is illustrated. In view of the foregoing structural and functional features described above, example methods will be better appreciated with reference to FIG. 3. While, for purposes of simplicity of explanation, the example method of FIG. 3 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

In an embodiment, the method 300 shown in FIG. 3 is implemented by the controller 150. The method 300 may also be implemented by one or more controllers operating together to perform various steps of the method. The method 300 can begin at step 302 with the controller receiving operating parameter input signals from a plurality of sensors configured to monitor operating parameters of a system. As discussed above, in one example, the sensors monitor operating parameters of a gas dehydration system and may monitor temperature, pressure, flow rate, or other relevant operating parameters at selected locations within the system. In an example, the selected process variable is the moisture content of a dry gas stream exiting a gas contractor of a gas dehydration system. The method continues at step 304 in which the controller determines an inferred value of a selected process variable based on the operating parameter input signals using an inferential analyzer module. In certain examples, the inferential analyzer uses one or more of historical data, programmed data, machine learning, mathematical models, and combinations of the foregoing to determine the inferred value of the selected process variable. At step 306, a measured value of the selected process variable is received by the controller from a physical analyzer. For example, the selected process variable is the moisture content of a dry gas stream exiting a gas contractor of a gas dehydration system as previously described. The physical analyzer is an online analyzer, and in some embodiments, may be a TDL analyzer.

The method continues at step 308 in which the controller determines a difference between the measured value of the process variable and the inferred value of the process variable. The different may be determined as an absolute or relative difference. In addition, the controller may filter the measured value in order to reduce noise in the measured data. In one example, the controller determines the difference as the inferred value minus the measured value, divided by the inferred value. In some examples, the determined different may be reported as a percentage of the inferred value to normalize the results for further processing.

At step 310, the controller determines if the difference between the measured value and the inferred value exceeds a threshold. In an example, the threshold is predefined and represents a maximum allowable deviation before a validation and calibration is required to ensure the system is accurate monitoring the selected process variable. For example, in the gas dehydration system shown in FIG. 1, the threshold may be selected to be 15%. If the difference between the measured moisture content and the inferred moisture content as determined by the controller is less than or equal to 15% of the inferred moisture content, the controller determines that the difference has not exceeded the threshold and the method returns to step 302. However, if the difference between the measured moisture content and the inferred moisture content as determined by the controller is greater than 15% of the inferred moisture content, the controller determines that the difference has exceeded the threshold, and in response, the controller initiates a recalibration of the physical analyzer or recalibration of the inferential analyzer as further described.

In subsequent steps, the controller determines whether to recalibration the physical analyzer, the inferential analyzer or both, based, at least in part, on the monitored operating parameters. In addition to receiving the operating parameter input signals from the plurality of sensors, the controller monitors the operating parameter values over time for changes in the operating parameters. The controller determines whether a detected change in the operating parameters over time exceeds an operating parameter change threshold. Based on this determination, the controller is identifies when the sensors indicate a change in the operating parameters (e.g., temperature, pressure, flow rate), which suggest a change in the selected process variable may be expected.

Similarly, the controller monitors the measured value and inferred value of the selected process variable over time to identify changes in these values that may indicate a change in the process or monitored product. In various embodiments, controller may use the same threshold or different thresholds to identify changes to the measured value and the inferred value of the selected process variable. In one example, the controller compares a change in the measured value of the selected process variable to a second threshold (e.g., a physical analyzer change threshold), and compares a change in the inferred value of the selected process variable to a third threshold (e.g., an inferential analyzer change threshold). In this manner, the controller may apply different levels of sensitivity when identifying changes that require validation or calibration of the system components.

Based on the analysis of the operating parameters, measured value, inferred value, the method 300 proceeds to initiate a recalibration of the physical analyzer, the inferential analyzer, or both based on the conditions shown in steps 312, 316 and 320.

As one example, at step 312, when the difference between the inferred value and the measured value is greater than 15% (i.e., the inferred value is at least 15% greater than the measured value) and the change in the measured value has not exceeded the second threshold, the method proceeds to step 314.

At step 314, if the operating parameters have changed outside a recommended operating window for the system, the controller initiates a recalibration of the physical analyzer at step 330. In an example, the controller performs the recalibration of the physical analyzer as described with respect to FIG. 2, such as by applying a calibration gas of known properties to the physical analyzer to validate and calibration the analyzer to confirm proper operation. In this manner, the controller determines that the measured value reported by the physical analyzer has not changed even though the operating parameters as monitored by the sensors have changed outside the recommend operating window, thereby suggesting a possible fault in the physical analyzer.

However, if the operating parameters have not changed outside a recommended operating window for the system, the controller initiates a recalibration of the inferential analyzer at step 340. In this manner, the controller determines that the inferred value determined by the inferential analyzer has changed even though the operating parameters as monitored by the sensors have not changed outside the recommend operating window, thereby suggesting a possible fault in the inferential analyzer. In one example, recalibration of the inferential analyzer includes updating the historical data of the inferential analyzer based on the received operating parameter input signals and the measured value of the selected process variable received from the physical analyzer. The inferential analyzer may thus be improved as the historical data set is increased to reflect operation of the system.

As another example, at step 316, when the difference between the inferred value and the measured value is less than −15% (i.e. the inferred value is at least 15% less than the measured value) and the change in the inferred value has not exceeded the third threshold, the method proceeds to step 328.

At step 318, if the operating parameters have not changed outside a recommended operating window for the system, the controller initiates a recalibration of the physical analyzer at step 330. In this manner, the controller determines that the measured value reported by the physical analyzer has changed even though the operating parameters as monitored by the sensors have not changed outside the recommend operating window, thereby suggesting a possible fault in the physical analyzer.

However, if the operating parameters have changed outside a recommended operating window for the system, the controller initiates a recalibration of the inferential analyzer at step 340. In this manner, the controller determines that the inferred value determined by the inferential analyzer has not changed even though the operating parameters as monitored by the sensors have changed outside the recommend operating window, thereby suggesting a possible fault in the inferential analyzer.

At step 320, if the controller determines that the change in the measured value from the physical analyzer exceeds the second threshold and that the change in the inferred value of the inferential analyzer exceeds the third threshold, the method 300 proceeds to step 350 at which the controller triggers a recalibration of both the physical analyzer and the inferential analyzer. In one example, at step 350, the controller initiates recalibration at step 330 and step 340 as previously discussed. However, in other examples, at step 350, the controller sends a notification to operating personnel that the physical analyzer and inferential analyzer results have changed in a manner that requires the operating personnel to investigate and revalidate the analyzes.

Figure 4:
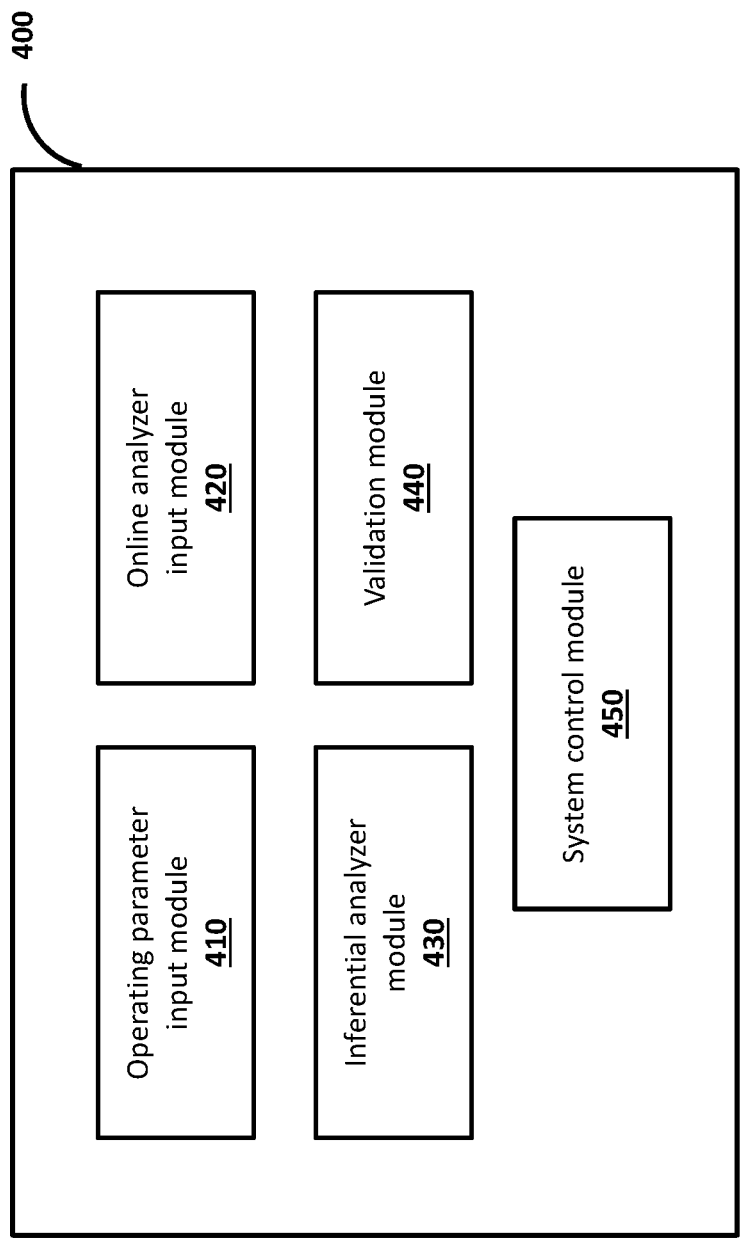
FIG. 4 is a simplified block diagram of a controller configured to implement the method shown in FIG. 3.

Referring now to FIG. 4, a simplified block diagram of a controller configured to implement the method shown in FIG. 3 is illustrated. In one embodiment, the controller 400 includes an operating parameter input module 410, an online analyzer input module 420, an inferential analyzer module 430, a system control module 440, and a validation module 450.

The operating parameter input module 410 is configured to receive operating parameter input signals from a plurality of sensors. In embodiments, the operating parameter input module 410 implements step 302.

The online analyzer input module 420 is configured to receive an input signal from the online analyzer indicating the value of a selected process variable of the system. In embodiments, the online analyzer input module 420 implements step 304. For example, the online analyze module 420 may receive an output signal from the physical moisture analyzer 130 as discussed above.

The inferential analyzer module 430 is configured to determine an inferred value of the selected process variable based, at least in part, on the operating parameters measured by the plurality of sensors. As explained above the inferential analyzer 430 may also use historical data, programmed data, machine learning, mathematical models, and combinations of the foregoing to determine the inferred value of the selected process variable. In embodiments, the inferential analyzer module 430 implements step 304 to determine an inferred value of the selected process variable, and step 340 to recalibrate the inferential analyzer as discussed above.

The system control module 440 is configured to control components of the system in response to the controller determining that a validation or calibration of the online analyzer is required. For example, for the system of FIG. 2, the system control module 440 includes control logic for operating the valves necessary to provide the calibration gas to the physical moisture analyzer, and to restoring operation of the system once the calibration is complete. In embodiments, the system control module 440 implements step 330 to perform the calibration of the physical analyzer.

The validation module 450 is configured to determine a difference between the value of the selected process variable as measured by the online analyzer and the inferred value of the selected process variable as determined by the inferential analyzer module 430. The validation module 450 is further configured to initiate a recalibration of either the online analyzer or the inferential analyzer module if the difference exceeds a predetermined threshold. In embodiments, the validation module 450 performs the remaining steps of the method 300.

To further illustrate the technical effect of the presently disclosed systems and methods, an example using the automatic online analyzer validation and calibration is illustrated. In a gas dehydration system, such as the system described above in connection with FIG. 1, numerous operating parameters may be measured by a plurality of sensors. Table 1 illustrates a set of measured operating parameters and the corresponding expected values for such parameters in a gas dehydration system.

| Reboiler Temp | 285° F. |
|---|---|
| Gas Flow Rate | 370 MMSCFD |
| TEG Recirculation flow | 230 gpm |
| TEG Reboiler Press | 0.95 psig |
| Stripping Gas Flow | 0.03 MMSCFD |
| Gas inlet Temp | 135° F. |
| Gas Inlet Press | 355 psig |
| Lean glycol Return Temp | 145° F. |

During operation if the operating parameters measured by the plurality of sensors have the expected values shown above, the inferential analyzer determines the inferred value of the moisture content of the dry gas stream to be 115 lb/MMSCF. In operation, the physical analyzer measures the moisture content of the dry gas stream, and the controller determines the different between the measured value and the inferred value of the moisture content. If the difference between the measured value and the inferred value is less than the predetermined threshold, the system has validated the operation of the physical analyzer. However if the difference exceeds the predetermined threshold, the system performs a recalibration of the physical analyzer, the inferential analyzer, or both as described above.

In another example, the sensors may measure operating parameters different than the expected values shown in Table 1. For example, the sensors may measure the reboiler temperature is below the desired 285° F. and may measure a high moisture content in the lean glycol. Based on these operating parameter inputs, the inferential analyzer determines an inferred value of the dry gas stream moisture content that is greater than 115 lbs/MMSCF. If the physical analyzer measuring the dry gas stream moisture content continues to report 115 lbs/MMSCF, the difference between the measured value and the inferred value may exceed the predetermined threshold. In this example, because the operating parameters changed but the physical analyzer measurement did not change, the controller would initiate a recalibration of the physical analyzer as described for step 330 in FIG. 3. The ability to automatically validate and when appropriate calibrate the physical analyzer and/or inferential analyzer based on the measured operating parameters improves the reliability of the system by detecting potential errors, and thereby assists in ensuring the desired quality of the product is maintained.

Figure 5:
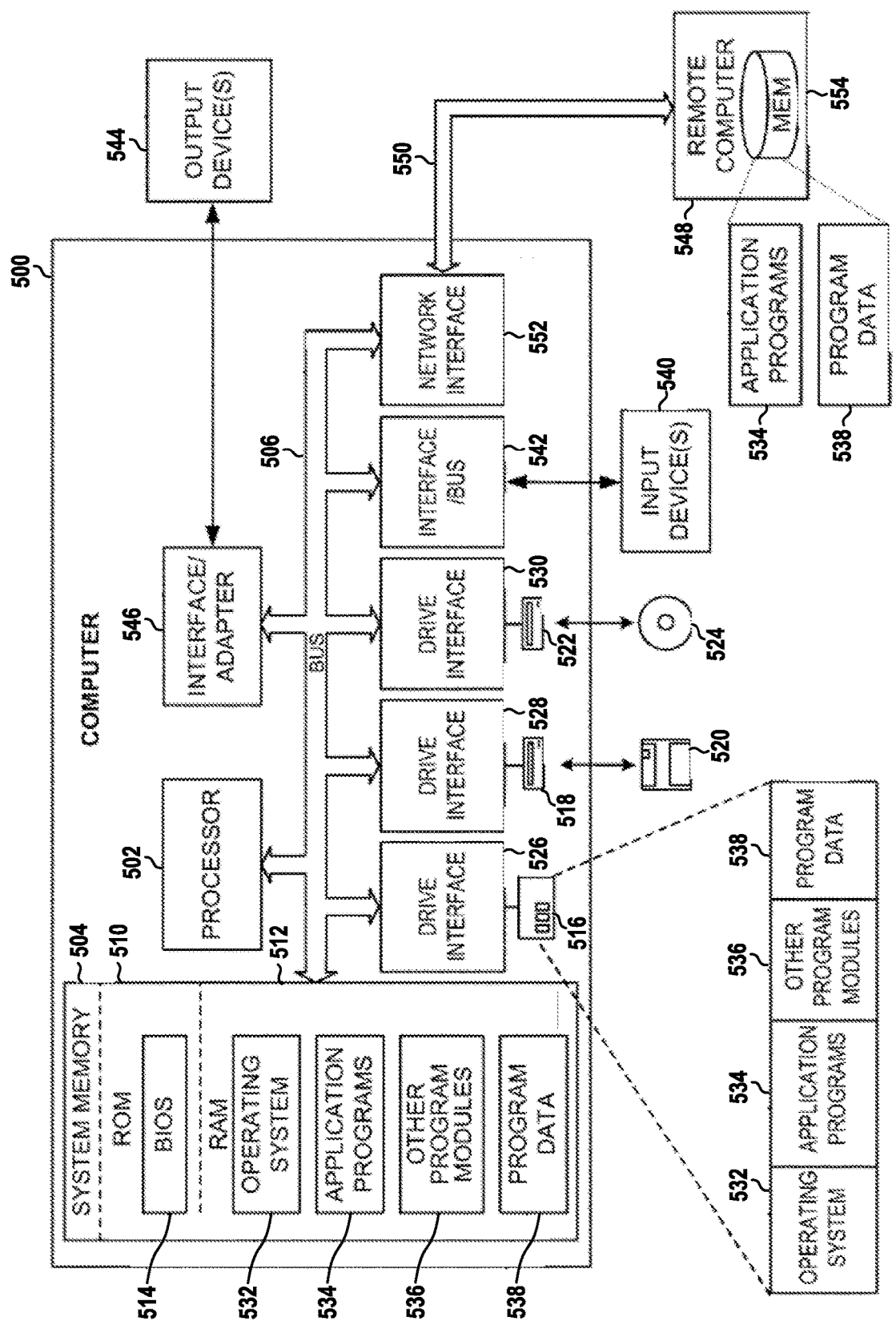
FIG. 5 is an embodiment of a computer system for implementing aspects of the present disclosure.

Referring now to FIG. 5, in view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 5. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

In this regard, FIG. 5 illustrates one example of a computer system 500 that can be employed to execute one or more embodiments of the present disclosure. Computer system 500 can be implemented on one or more general purpose networked computer systems, embedded computer systems, routers, switches, server devices, client devices, various intermediate devices/nodes or standalone computer systems. Additionally, computer system 500 can be implemented on various mobile clients such as, for example, a personal digital assistant (PDA), laptop computer, pager, and the like, provided it includes sufficient processing capabilities.

Computer system 500 includes processing unit 502, system memory 504, and system bus 506 that couples various system components, including the system memory 504, to processing unit 502. Dual microprocessors and other multi-processor architectures also can be used as processing unit 502. System bus 506 may be any of several types of bus structure including a memory bus or memory controller, a peripheral bus, and a local bus using any of a variety of bus architectures. System memory 504 includes read only memory (ROM) 510 and random access memory (RAM) 512. A basic input/output system (BIOS) 514 can reside in ROM 510 containing the basic routines that help to transfer information among elements within computer system 500.

Computer system 500 can include a hard disk drive 516, magnetic disk drive 518, e.g., to read from or write to removable disk 520, and an optical disk drive 522, e.g., for reading CD-ROM disk 524 or to read from or write to other optical media. Hard disk drive 516, magnetic disk drive 518, and optical disk drive 522 are connected to system bus 506 by a hard disk drive interface 526, a magnetic disk drive interface 528, and an optical drive interface 530, respectively. The drives and associated computer-readable media provide nonvolatile storage of data, data structures, and computer-executable instructions for computer system 500. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 510, including operating system 532, one or more application programs 534, other program modules 536, and program data 538. In some examples, the application programs 534 can include operating parameter input module 410, online analyzer input module 420, inferential analyzer module 430, system control module 440, and validation module 450, and the program data 538 can include a look up table, historical data, or other saved data used by the inferential analyzer module to determine the expected moisture content of the gas stream or other process variable as desired. The application programs 534 and program data 538 can include functions and methods programmed to perform the validation and calibration of the online analyzer, including the recalibration of the online analyzer and/or inferential analyzer based on the operating parameter inputs, such as shown and described herein.

A user may enter commands and information into computer system 500 through one or more input devices 540, such as a pointing device (e.g., a mouse, touch screen), keyboard, microphone, joystick, game pad, scanner, and the like. For instance, the user can employ input device 540 to edit or modify the calibration process or the data provided for the inferential analyzer to determine the expected moisture content of the gas stream or other process variable. For example, a user may use the input devices 540 to input historical data or laboratory test data to further define a relationship between the operating parameters and the expected moisture content or other process variable. These and other input devices 540 are often connected to processing unit 502 through a corresponding port interface 542 that is coupled to the system bus, but may be connected by other interfaces, such as a parallel port, serial port, or universal serial bus (USB). One or more output devices 544 (e.g., display, a monitor, printer, projector, or other type of displaying device) is also connected to system bus 506 via interface 546, such as a video adapter.

Computer system 500 may operate in a networked environment using logical connections to one or more remote computers, such as remote computer 548. Remote computer 548 may be a workstation, computer system, router, peer device, or other common network node, and typically includes many or all the elements described relative to computer system 500. The logical connections, schematically indicated at 550, can include a local area network (LAN) and a wide area network (WAN). When used in a LAN networking environment, computer system 500 can be connected to the local network through a network interface or adapter 552. When used in a WAN networking environment, computer system 500 can include a modem, or can be connected to a communications server on the LAN. The modem, which may be internal or external, can be connected to system bus 506 via an appropriate port interface. In a networked environment, application programs 534 or program data 538 depicted relative to computer system 300, or portions thereof, may be stored in a remote memory storage device 554.

Embodiments disclosed herein include:

A. A system that includes a plurality of sensors configured to monitor operating parameters of a gas dehydration system; a physical moisture analyzer configured to measure moisture content of a gas stream; and a controller configured to: receive operating parameter input signals from the plurality of sensors, receive a measured moisture content of the gas stream from the physical moisture analyzer, determine a difference between the measured moisture content and an inferred moisture content determined by the controller based on the operating parameter input signals using an inferential moisture analyzer; and if the difference between the measured moisture content and the inferred moisture content exceeds a threshold, initiate a recalibration of the physical moisture analyzer or recalibration of the inferential moisture analyzer.

B. A method that includes receiving, by a controller, operating parameter input signals from a plurality of sensors configured to monitor operating parameters of a gas dehydration system; receiving, by the controller, a measured moisture content of a gas stream from a physical moisture analyzer; determining, by the controller, an inferred moisture content based on the operating parameter input signals using an inferential moisture analyzer module; determining, by the controller, a difference between the measured moisture content and the inferred moisture content; and if the difference between the measured moisture content and the inferred moisture content exceeds a threshold, initiating a recalibration of the physical moisture analyzer or recalibration of the inferential moisture analyzer.

C. A controller for automatic online analyzer calibration in a gas dehydration system, in which the controller includes an operating parameter input module configured to receive operating parameter input signals from a plurality of sensors configured to monitor operating parameters of the gas dehydration system; a physical moisture analyzer input module configured to receive a measured moisture content of a gas stream from a physical moisture analyzer; an inferential analyzer module configured to determine an inferred moisture content based on the operating parameter input signals; a validation module configured determine a difference between the measured moisture content and the inferred moisture content, and if the difference between the measured moisture content and the inferred moisture content exceeds a threshold, initiate a recalibration of the physical moisture analyzer or recalibration of the inferential moisture analyzer; and a system control module configured to control a plurality of valves to provide a calibration gas to the physical moisture analyzer to recalibrate the physical moisture analyzer.

D. A system that includes a plurality of sensors configured to monitor operating parameters of the system; a physical analyzer configured to measure a selected process variable of an output of the system; and a controller configured to: receive operating parameter input signals from the plurality of sensors, receive a measured value of the selected process variable of the output of the system from the physical analyzer, determine a difference between the measured value and an inferred value determined by the controller based on the operating parameter input signals using an inferential analyzer; and if the difference between the measured value and the inferred value exceeds a threshold, initiate a recalibration of the physical analyzer or recalibration of the inferential analyzer.

E. A method that includes receiving, by a controller, operating parameter input signals from a plurality of sensors configured to monitor operating parameters of a system; receiving, by the controller, a measured value of the selected process variable of the output of the system from a physical analyzer; determining, by the controller, an inferred value based on the operating parameter input signals using an inferential analyzer module; determining, by the controller, a difference between the measured value and the inferred value; and if the difference between the measured value and the inferred value exceeds a threshold, initiating a recalibration of the physical analyzer or recalibration of the inferential analyzer.

F. A controller for an online analyzer calibration system, in which the controller includes an operating parameter input module configured to receive operating parameter input signals from a plurality of sensors configured to monitor operating parameters of a system; a physical analyzer input module configured to receive a measured value of the selected process variable of the output of the system from a physical analyzer; an inferential analyzer module configured to determine an inferred value based on the operating parameter input signals; a validation module configured to determine a difference between the measured value and the inferred value, and if the difference between the measured value and the inferred value exceeds a threshold, initiate a recalibration of the physical analyzer or recalibration of the inferential analyzer; and a system control module configured to control the system to perform the automatic recalibration of the physical analyzer.

Each of embodiments A, B, C, D, E and F may have one or more of the following additional elements in any combination:

Element 1: wherein the threshold is 15% of the inferred moisture content determined by the controller.

Element 2: wherein the operating parameters include one or more of the gas stream pressure, temperature and flow rate, an input gas stream temperature, pressure and flow rate, and a drying agent temperature, pressure and flow rate.

Element 3: wherein the physical moisture analyzer includes a tunable diode laser.

Element 4: further comprising a calibration system configured to provide a calibration gas to the physical moisture analyzer; and wherein the controller is further configured to provide a first output signal to cause the calibration system to provide the calibration gas to the physical moisture analyzer to recalibrate the physical moisture analyzer.

Element 5: wherein the controller is further configured to provide a second output signal to cause the gas stream to be disconnected from the physical moisture analyzer prior to the calibration system providing the calibration gas to the physical moisture analyzer.

Element 6: wherein the inferential moisture analyzer determines inferred moisture content using a look up table correlating operating parameter values to expected moisture content of the gas stream.

Element 7: wherein the inferential moisture analyzer determines the inferred moisture content based on analysis of historical data correlating operating parameter values to measured moisture content values.

Element 8: wherein the controller is further configured to update the historical data of the inferential moisture analyzer based on the received operating parameter input signals and the measured moisture content received from the physical moisture analyzer.

Element 9: wherein the controller is further configured to determine whether a change in the operating parameter input signals over time exceeds an operating parameter change threshold.

Element 10: wherein the controller is further configured to determine whether a change in the measured moisture content over time exceeds a physical analyzer change threshold.

Element 11: wherein the controller is further configured to determine whether a change in the inferred moisture content over time exceeds an inferential analyzer change threshold.

Element 12: wherein the controller is further configured to initiate the recalibration of the physical moisture analyzer when a change in the operating parameter input signals over time exceeds an operating parameter change threshold and a change in the measured moisture content over time does not exceed a physical analyzer change threshold.

Element 13: wherein the controller is further configured to initiate the recalibration of the physical moisture analyzer when a change in the operating parameter input signals over time does not exceed an operating parameter change threshold and a change in the measured moisture content over time exceeds a physical analyzer change threshold.

Element 14: wherein the controller is further configured to initiate the recalibration of the inferential moisture analyzer when a change in the operating parameter input signals over time exceeds an operating parameter change threshold and a change in the inferred moisture content over time does not exceed an inferential analyzer change threshold.

Element 15: wherein the controller is further configured to initiate the recalibration of the inferential moisture analyzer when a change in the operating parameter input signals over time does not exceed an operating parameter change threshold and a change in the inferred moisture content over time exceeds an inferential analyzer change threshold.

Element 16: wherein the controller is further configured to initiate the recalibration of the physical moisture analyzer and recalibration of the inferential moisture analyzer when both a change in the measured moisture content over time exceeds a physical analyzer change threshold and a change in the inferred moisture content over time exceeds an inferential analyzer change threshold.

Element 17: wherein the controller is further configured to generate an alarm when both a change in the measured moisture content over time exceeds a physical analyzer change threshold and a change in the inferred moisture content over time exceeds an inferential analyzer change threshold.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that, if used, the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A system, comprising:
    a plurality of sensors configured to monitor operating parameters of a gas dehydration system;
    a physical moisture analyzer configured to measure moisture content of a gas stream; and
    a controller configured to:
        receive operating parameter input signals from the plurality of sensors,
        receive a measured moisture content of the gas stream from the physical moisture analyzer,
        determine a difference between the measured moisture content and an inferred moisture content determined by the controller based on the operating parameter input signals using an inferential moisture analyzer; and
        if the difference between the measured moisture content and the inferred moisture content exceeds a threshold, initiate a recalibration of the physical moisture analyzer or recalibration of the inferential moisture analyzer.

2. The system of claim 1, wherein the threshold is 15% of the inferred moisture content determined by the controller.

3. The system of claim 1, wherein the operating parameters include one or more of the gas stream pressure, temperature and flow rate, an input gas stream temperature, pressure and flow rate, and a drying agent temperature, pressure and flow rate.

4. The system of claim 1, wherein the physical moisture analyzer includes a tunable diode laser.

5. The system of claim 1, further comprising a calibration system configured to provide a calibration gas to the physical moisture analyzer; and wherein the controller is further configured to provide a first output signal to cause the calibration system to provide the calibration gas to the physical moisture analyzer to recalibrate the physical moisture analyzer.

6. The system of claim 1, wherein the controller is further configured to provide a second output signal to cause the gas stream to be disconnected from the physical moisture analyzer prior to the calibration system providing the calibration gas to the physical moisture analyzer.

7. The system of claim 1, wherein the inferential moisture analyzer determines inferred moisture content using a look up table correlating operating parameter values to expected moisture content of the gas stream.

8. The system of claim 1, wherein the inferential moisture analyzer determines the inferred moisture content based on analysis of historical data correlating operating parameter values to measured moisture content values.

9. The system of claim 8, wherein the controller is further configured to update the historical data of the inferential moisture analyzer based on the received operating parameter input signals and the measured moisture content received from the physical moisture analyzer.

10. The system of claim 1, wherein the controller is further configured to determine whether a change in the operating parameter input signals over time exceeds an operating parameter change threshold.

11. The system of claim 1, wherein the controller is further configured to determine whether a change in the measured moisture content over time exceeds a physical analyzer change threshold.

12. The system of claim 1, wherein the controller is further configured to determine whether a change in the inferred moisture content over time exceeds an inferential analyzer change threshold.

13. The system of claim 1, wherein the controller is further configured to initiate the recalibration of the physical moisture analyzer when a change in the operating parameter input signals over time exceeds an operating parameter change threshold and a change in the measured moisture content over time does not exceed a physical analyzer change threshold.

14. The system of claim 1, wherein the controller is further configured to initiate the recalibration of the physical moisture analyzer when a change in the operating parameter input signals over time does not exceed an operating parameter change threshold and a change in the measured moisture content over time exceeds a physical analyzer change threshold.

15. The system of claim 1, wherein the controller is further configured to initiate the recalibration of the inferential moisture analyzer when a change in the operating parameter input signals over time exceeds an operating parameter change threshold and a change in the inferred moisture content over time does not exceed an inferential analyzer change threshold.

16. The system of claim 1, wherein the controller is further configured to initiate the recalibration of the inferential moisture analyzer when a change in the operating parameter input signals over time does not exceed an operating parameter change threshold and a change in the inferred moisture content over time exceeds an inferential analyzer change threshold.

17. The system of claim 1, wherein the controller is further configured to initiate the recalibration of the physical moisture analyzer and recalibration of the inferential moisture analyzer when both a change in the measured moisture content over time exceeds a physical analyzer change threshold and a change in the inferred moisture content over time exceeds an inferential analyzer change threshold.

18. The system of claim 1, wherein the controller is further configured to generate an alarm when both a change in the measured moisture content over time exceeds a physical analyzer change threshold and a change in the inferred moisture content over time exceeds an inferential analyzer change threshold.

19. A method comprising,
    receiving, by a controller, operating parameter input signals from a plurality of sensors configured to monitor operating parameters of a gas dehydration system;
    receiving, by the controller, a measured moisture content of a gas stream from a physical moisture analyzer;
    determining, by the controller, an inferred moisture content based on the operating parameter input signals using an inferential moisture analyzer module;

determining, by the controller, a difference between the measured moisture content and the inferred moisture content; and if the difference between the measured moisture content and the inferred moisture content exceeds a threshold, initiating a recalibration of the physical moisture analyzer or recalibration of the inferential moisture analyzer module.

20. A controller for automatic online analyzer calibration in a gas dehydration system, the controller comprising, an operating parameter input module configured to receive operating parameter input signals from a plurality of sensors configured to monitor operating parameters of the gas dehydration system;

a physical moisture analyzer input module configured to receive a measured moisture content of a gas stream from a physical moisture analyzer;

an inferential analyzer module configured to determine an inferred moisture content based on the operating parameter input signals;

a validation module configured determine a difference between the measured moisture content and the inferred moisture content, and if the difference between the measured moisture content and the inferred moisture content exceeds a threshold, initiate a recalibration of the physical moisture analyzer or recalibration of the inferential analyzer module; and a system control module configured to control a plurality of valves to provide a calibration gas to the physical moisture analyzer to recalibrate the physical moisture analyzer.

* * * * *